United States Patent
Gyuricsko et al.

(10) Patent No.: US 8,104,779 B2
(45) Date of Patent: Jan. 31, 2012

(54) BEARING FOR FOLLOWER OR CAM

(75) Inventors: Frederick S. Gyuricsko, Torrington, CT (US); Jay W. Phoenix, Bristol, CT (US)

(73) Assignee: Roller Bearing Company of America, Inc., Oxford, CT (US)

( * ) Notice: Subject to any disclaimer, the term of this patent is extended or adjusted under 35 U.S.C. 154(b) by 988 days.

(21) Appl. No.: 11/937,538

(22) Filed: Nov. 9, 2007

(65) Prior Publication Data

US 2008/0152274 A1    Jun. 26, 2008

Related U.S. Application Data

(60) Provisional application No. 60/876,961, filed on Dec. 21, 2006.

(51) Int. Cl.
    *B62B 5/00* (2006.01)
(52) U.S. Cl. .................. 280/79.11; 280/79.2; 280/43
(58) Field of Classification Search .......... 280/79.11, 280/79.2, 43; 384/129, 255, 256, 560, 561
See application file for complete search history.

(56) References Cited

U.S. PATENT DOCUMENTS

| | | | |
|---|---|---|---|
| 1,630,339 A | 5/1927 | Ganster | |
| 2,198,376 A | 4/1940 | Cederberg | |
| 2,265,554 A | 12/1941 | Thomas | |
| 2,318,903 A | 5/1943 | Thomas | |
| 2,597,524 A | 5/1952 | Birt | |
| 2,643,162 A * | 6/1953 | Barr | 384/58 |
| 2,977,163 A * | 3/1961 | Gales | 384/584 |
| 3,302,986 A * | 2/1967 | Grolman et al. | 384/452 |
| 3,596,533 A | 8/1971 | Nightingale | |
| 3,888,134 A * | 6/1975 | Miranda | 74/405 |
| 4,327,036 A | 4/1982 | Marsh | |
| 4,502,738 A | 3/1985 | Nauta | |
| 4,909,641 A * | 3/1990 | McKenzie | 384/536 |
| 4,953,353 A * | 9/1990 | Lederman | 60/345 |

(Continued)

FOREIGN PATENT DOCUMENTS

DE    4327036    2/1995

(Continued)

OTHER PUBLICATIONS

Search Report dated Jun. 12, 2008.

*Primary Examiner* — Hau Phan
*Assistant Examiner* — Travis Coolman
(74) *Attorney, Agent, or Firm* — Michaud-Kinney Group LLP

(57) ABSTRACT

A bearing includes an inner race member having an end surface. An outer race member is disposed about the inner race member. The outer race member has an internal shoulder for engaging the end surface of the inner race member. The inner and outer race members are configured to define a raceway between them and to define a snap ring seat between them. There are cylindrical rollers in the raceway and a snap ring in the snap ring seat. The bearing may be provided as a follower head on a cam follower or may be eccentrically mounted on a drive shaft to serve as a cam. A cargo dolly may include such a cam near a wheel, to help the wheel overcome an obstacle. A bearing can be assembled by inserting the inner race member into the outer race member, disposing cylindrical rollers in the raceway and disposing a snap ring in the snap ring seat.

2 Claims, 4 Drawing Sheets

U.S. PATENT DOCUMENTS

| | | | | |
|---|---|---|---|---|
| 4,955,732 A | * | 9/1990 | Behrens | 384/484 |
| 4,993,328 A | * | 2/1991 | Wendt et al. | 105/150 |
| 4,993,849 A | * | 2/1991 | Radinger et al. | 384/447 |
| 5,263,547 A | * | 11/1993 | Alber | 180/8.2 |
| 5,352,047 A | * | 10/1994 | Ingall et al. | 384/572 |
| 5,525,109 A | * | 6/1996 | Hofmann et al. | 464/111 |
| 6,164,398 A | * | 12/2000 | Alber | 180/8.2 |
| 6,267,510 B1 | | 7/2001 | Herber et al. | |
| 6,450,585 B1 | | 9/2002 | Kochsiek | |
| 6,732,631 B1 | * | 5/2004 | Bitzer et al. | 92/72 |
| 6,848,890 B2 | * | 2/2005 | Nakazawa | 417/410.1 |
| 7,182,583 B2 | * | 2/2007 | Gandrud et al. | 417/371 |
| 2005/0245183 A1 | * | 11/2005 | Deshpande et al. | 451/357 |
| 2007/0015619 A1 | * | 1/2007 | Sasahara et al. | 475/178 |
| 2011/0188795 A1 | | 8/2011 | Gyuricsko et al. | |

FOREIGN PATENT DOCUMENTS

| | | |
|---|---|---|
| EP | 0568852 A1 | 11/1993 |
| FR | 2710115 | 3/1995 |
| FR | 2738881 | 3/1997 |

* cited by examiner

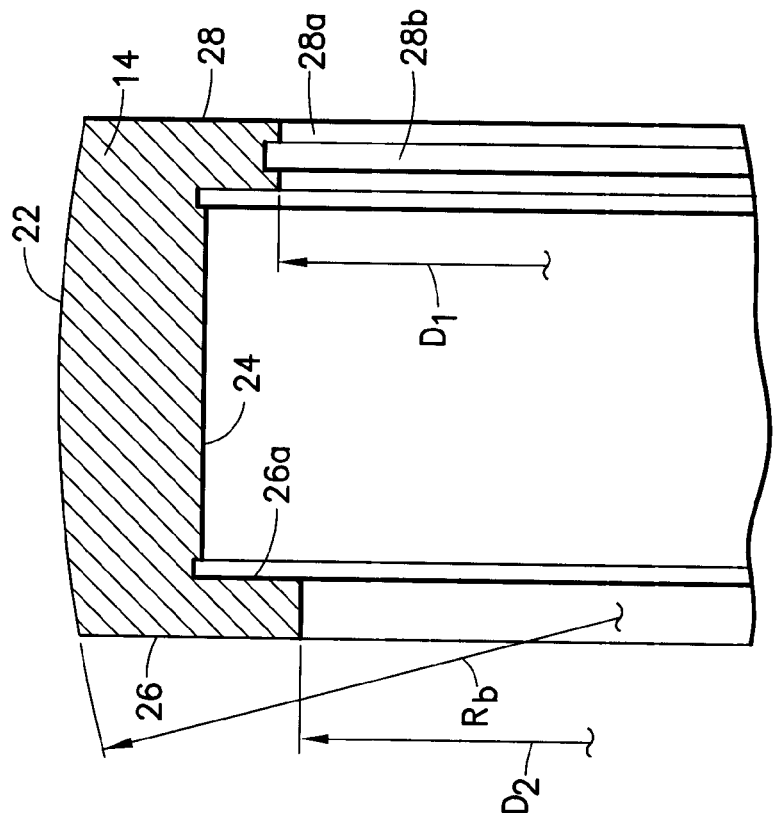
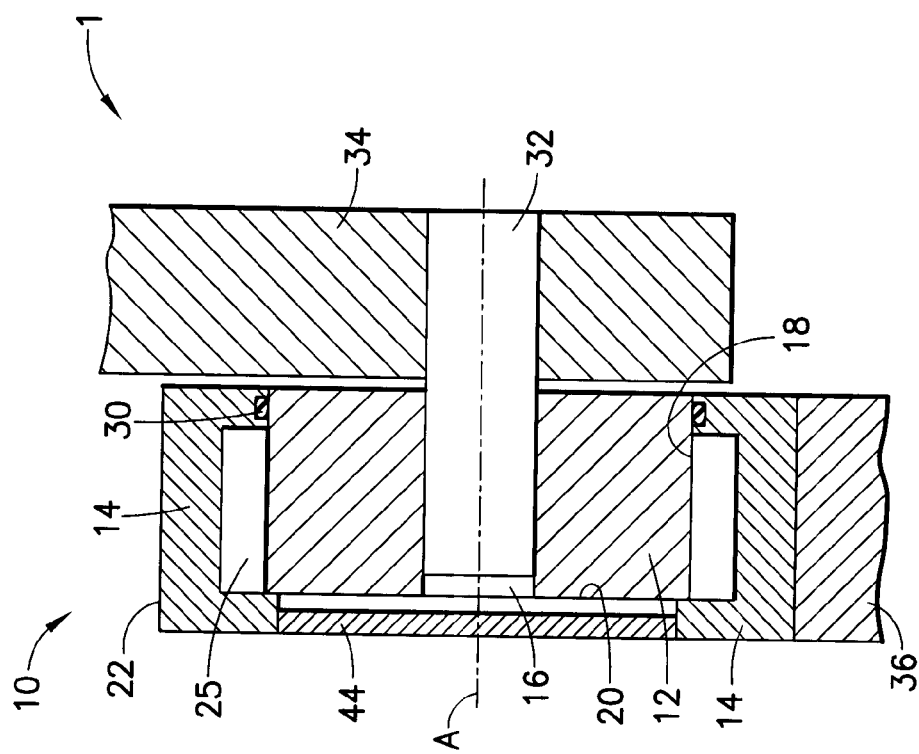

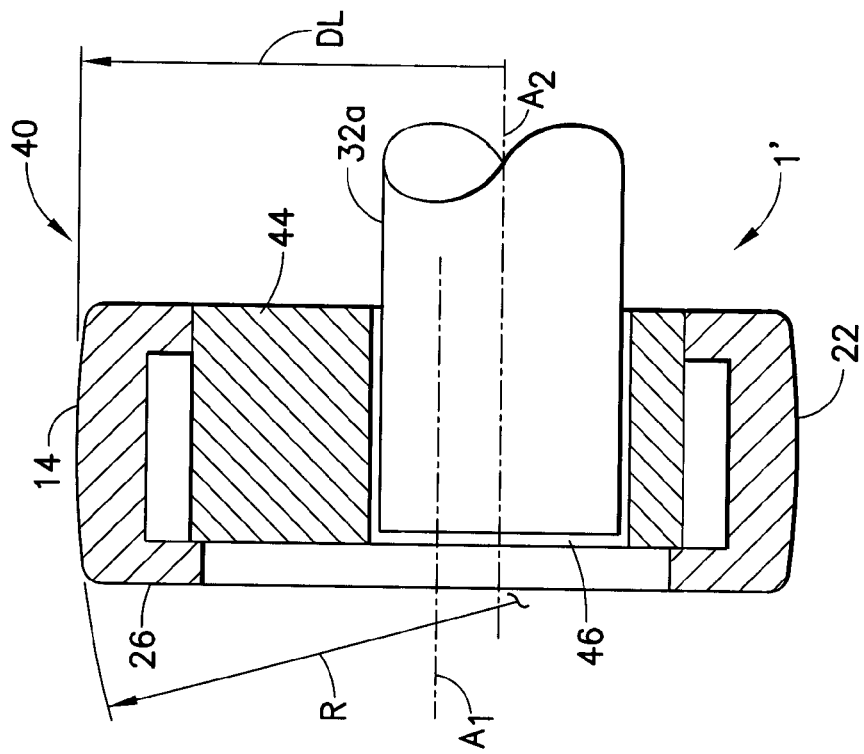
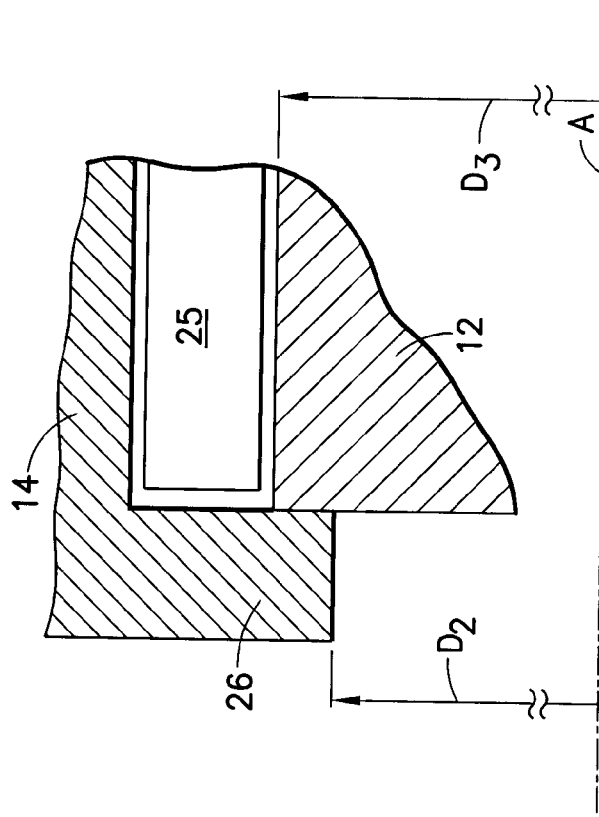
FIG.3A
FIG.2B

BEARING FOR FOLLOWER OR CAM

CROSS-REFERENCE TO RELATED APPLICATION

This application claims the benefit of U.S. provisional application No. 60/876,961 filed Dec. 21, 2006, which is incorporated herein by reference.

FIELD OF THE INVENTION

This invention relates to bearings for cams and followers.

BACKGROUND

A cam rotates on a drive shaft and generates reciprocating motion when another structure is in contact with the circumferential surface of the cam. If the drive shaft is fixedly mounted, the other structure rides on the circumferential surface of the cam and is referred to as a "cam follower" or, simply, a "follower". If the drive shaft is movable (e.g., because the drive shaft is mounted on a movable structure), the circumferential surface of the cam may bear against a stationary structure, and the cam generates reciprocating motion in the movable structure and the cam, together. Regardless of whether the drive shaft is stationary or movable, rotation of the cam can lead to frictional wear of the circumferential surface of the cam and of the follower or other structure in contact with the cam.

It is the general object of this invention to provide improvements to cams and followers.

SUMMARY OF THE INVENTION

The present invention resides in one aspect in a bearing that comprises an inner race member having an end surface and an outer race member disposed about the inner race member. The outer race member has an internal shoulder for engaging the end surface of the inner race member, and the inner race member and the outer race member are configured to define a raceway between them and to define a snap ring seat between them. There is a plurality of cylindrical rollers in the raceway and a snap ring in the snap ring seat.

In one embodiment, the above-described bearing is provided as a follower head on a cam follower. In an alternative embodiment, the bearing is eccentrically mounted on a drive shaft so that the bearing can serve as a cam.

Another specific aspect of the invention relates to a cargo dolly comprising a chassis, a wheel, a drive shaft near the wheel and a cam mounted eccentrically on the drive shaft.

The present invention resides in another aspect in a method of assembling a bearing. The method comprises providing an inner race member having an outside diameter and an end surface and a first snap ring groove. The method also includes providing an outer race member having a first shoulder, the first shoulder having an internal diameter that is larger than the outside diameter of the inner race member and having a second snap ring groove. The outer race member also has a second shoulder that has an internal diameter that is less than the outside diameter of the inner race member. The second shoulder has a stop surface. The outer race member has an interior surface between the first shoulder and the second shoulder, for receiving cylindrical rollers therein. The method includes disposing a plurality of cylindrical rollers in the interior surface. The inner race member is inserted into the outer race member so that the stop surface engages the end surface and so that the first snap ring groove and the second snap ring groove are aligned to define a seat for a snap ring. A snap ring is disposed in the snap ring seat.

BRIEF DESCRIPTION OF THE DRAWINGS

FIG. 1 is a schematic cross-sectional view of one embodiment of a cam follower head as described herein, the head being shown as mounted on a follower body;

FIG. 2A is a schematic cross-sectional view of a portion of the outer race member of the follower head of FIG. 1;

FIG. 2B shows a detail of FIG. 1;

FIG. 3A is a schematic cross-sectional view of another embodiment of a cam follower head as described herein;

DETAILED DESCRIPTION OF THE INVENTION

Figure 3C:
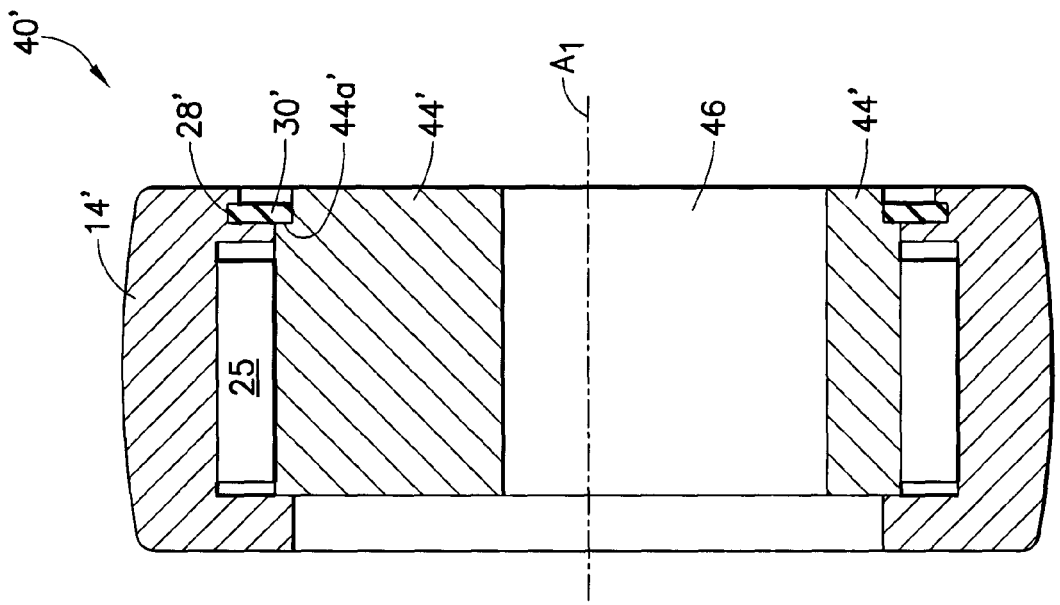
FIG. 3C is a schematic cross-sectional view of yet another embodiment of a bearing for a cam follower head as described herein.

A bearing that can be used to improve a follower or to improve an eccentrically rotating circular cam includes an inner race member mounted in an outer race member, with a plurality of rollers between the inner race member and the outer race member. The bearing is self-supporting, in that once it is assembled, the outer ring will not separate from the inner ring.

An illustrative embodiment of a bearing for a follower is shown in FIGS. 1, 2A and 2B. As seen in FIG. 1, the follower 1 comprises a bearing 10 having an inner race member 12 disposed within an outer race member 14. The inner race member 12 and the outer race member 14 are both generally annular and share a common central axis A.

The inner race member 12 has an annular configuration including a central aperture 16 for receiving a shaft 32 that extends to, and provides connection with, a follower body 34. The inner race member 12 has a cylindrical outer surface 18 and an end surface 20.

The outer race member 14 has a generally annular configuration that includes an outer surface 22 for bearing against a cam 36. The outer surface 22 may optionally conform to a radius of curvature Rb (FIG. 2) to accommodate variations in the alignment of the follower 1 relative to the cam 36. Alternatively, an outer race member may have a cylindrical outer surface.

There is a plurality of cylindrical rollers 25, for example, needle rollers, between the inner race member 12 and the outer race member 14.

Referring now to FIG. 2A, the outer race member 14 has an interior surface 24 between a first shoulder 28 and a second shoulder 26. Both the first shoulder 28 and the second shoulder 26 extend inwardly (i.e., towards axis A) from the interior surface 24. The interior surface 24 is substantially in parallel to the central axis A and serves as a seat for the cylindrical rollers 25 and as a reservoir for lubricant for the rollers.

The first shoulder 28 has an interior diameter $D_1$ that is defined by an interior surface 28$a$. The interior diameter $D_1$ is slightly larger than the outside diameter $D_3$ (FIG. 2B) of the inner race member 12, such that the inner race member 12 can be inserted into the outer race member through the first shoulder 28. The first shoulder 28 has a snap ring groove 28b on the interior surface 28a that can face a like groove (not shown) on the exterior surface 12a to provide a seat for a snap ring 30, as shown in FIG. 1.

The second shoulder 26 has an internal diameter $D_2$ that is smaller than the outside diameter D3 of the inner race member 12, so the second shoulder provides a stop surface 26a that engages the end surface 20 on the inner race member, as seen in FIG. 2B. Thus, the second shoulder 26 provides a stop for the insertion of the inner race member 12 into the outer race member 14. When the inner race member 12 bears against the second shoulder 26, the groove 28b aligns with a corresponding groove (not shown) on the inner race member to provide a seat for the snap ring 30 (FIG. 1). When the bearing 10 is assembled with the snap ring 30 in place, the snap ring helps maintain the assembled configuration. In addition, the engagement of the second shoulder 26 with the end surface 20 helps the bearing 10 withstand thrust in an axial direction generated by offset or misaligned loading of the follower body 34.

Optionally, the bearing 10 may comprise one or more sealing discs 44 (FIG. 1) that protect the interior of the outer race member 14 from excessively dirty or contaminated environments, and that prolong the life of the bearing, which serves as a follower head on the follower 1.

In an alternative embodiment shown in FIG. 3A, a bearing 40 comprises an outer race member 14 within which there is an inner race member 44 that has a cylindrical outer surface. There is a plurality of rollers 25 between the outer race member 14 and the inner race member 44. The exterior surface of the outer race member 14 and the outer surface of the inner race member 44 are both circular and concentric with each other relative to a central axis A1. The outer race member 14 can rotate about the inner race member 44 about the central axis A1. The inner race member 44 has a central aperture 46 for receiving a shaft 32a that is rotatable about an axis A2. The central aperture 46 in the inner race member 44 is disposed off-center relative to the central axis A1, such that the bearing 40 is eccentrically mounted on the drive shaft 32a. In the orientation of FIG. 3A, the inner race member 44 has a large diameter portion above the axis A2 (indicated by arrow DL). Therefore, when the shaft 32a rotates about the axis A2, the bearing 40 can serve as a cam even though it has a circular exterior configuration. The shaft 32a may be round in cross-section or may have a non-round cross-sectional configuration, such as the lobed configuration seen in FIG. 3B, to facilitate the transfer of torque from the shaft to the inner race member 44.

Figure 3B:
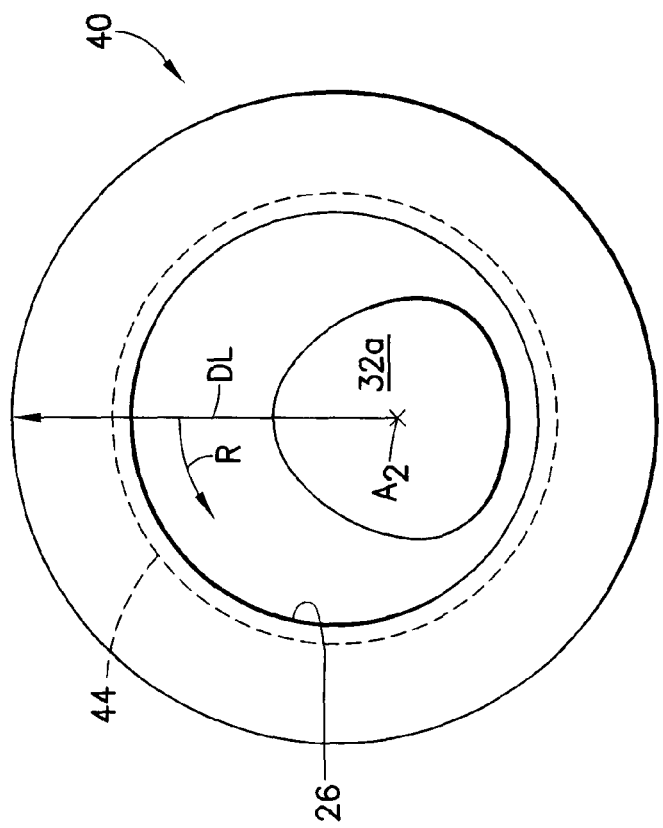
FIG. 3B is a schematic elevation view of one embodiment of a cam as shown in FIG. 3A.

Still another embodiment of a bearing for a follower is shown in FIG. 3C. The bearing 40' has an inner race member 44' disposed within an outer race member 14' that are configured generally in the same way as the outer race member 14 and the inner race member 44 of bearing 40 (FIG. 3A), with the following differences. The inner race member 44' has a stepped outer surface that includes a shoulder 44a.' The outer race member 14' has a groove 28' that is aligned with the shoulder 44a' on the inner race member 44' when the inner race member is fully inserted into the outer race member 14'. A snap-ring 30' having a washer-like configuration is received in the groove 28' and serves to inhibit the removal of the inner race member 44' from the outer race member 14' by bearing against the shoulder 44a'.

Figure 4:
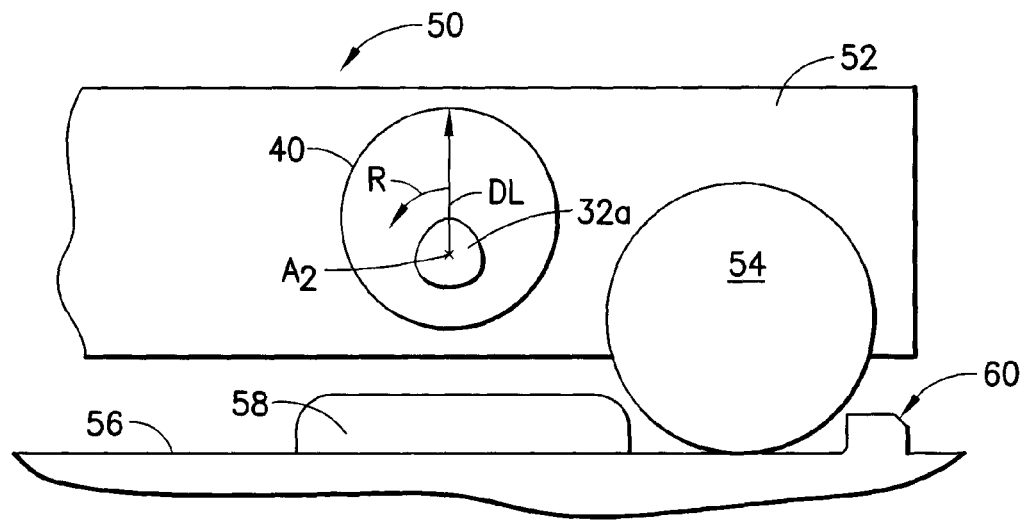
FIG. 4 is a schematic elevation view of a cargo dolly equipped with a follower head according to another embodiment of the invention.

In one application, the shaft 32a is rotatably mounted on a cargo dolly 50, as seen in FIG. 4. The cargo dolly 50 has chassis 52 on which is mounted a wheel 54 by which the cargo dolly 50 rolls on a floor 56, carrying a load (not shown). The cargo dolly 50 has a shaft 32a rotatably mounted on the chassis 52 near the wheel 54, and the bearing 40 is eccentrically mounted on the shaft 32a. In the orientation shown in FIG. 4, the bearing 40 has a large diameter portion above axis A2. The bearing 40 is positioned and configured so that when, as seen in FIG. 4, the large diameter portion of the bearing 40 (indicated by arrow DL) is disposed away from the floor (i.e., in a retracted position). However, when the bearing 40 is rotated via shaft 32a as indicated by the rotation arrow R, the large diameter portion of the follower head does extend downward beyond the bottom of the cargo dolly 50, the maximum downward extension occurring at a rotation of 180° relative to the position seen in FIG. 4.

Figure 5:
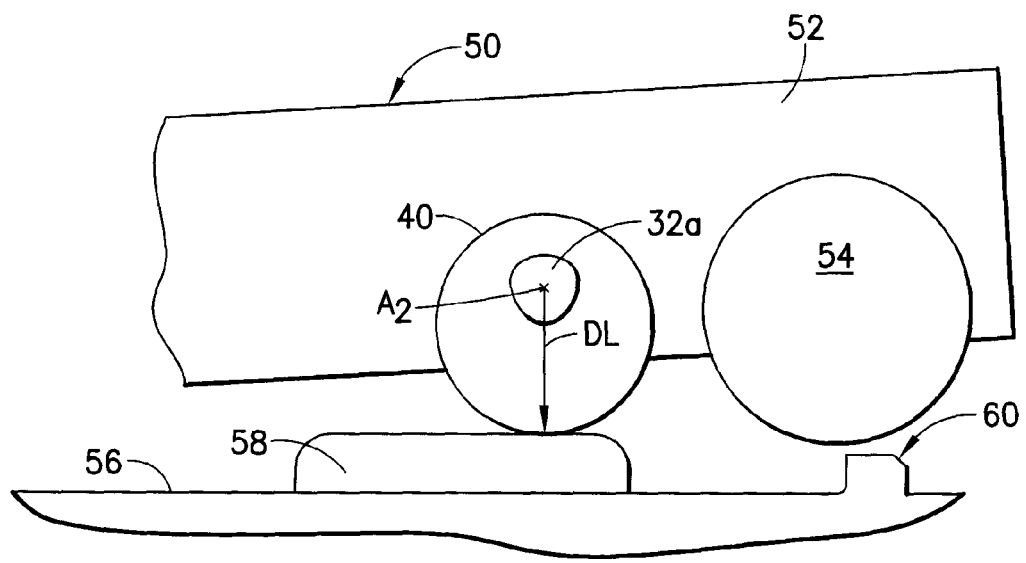
FIG. 5 is a schematic elevation view of the cargo dolly of FIG. 4 configured to overcome an obstacle by use of the follower head.

The bearing 40 is employed when the cargo dolly 50 encounters an obstacle on the floor 56 such as a small step between horizontally misaligned sections of floor or a door threshold or the like. A reaction plate 58 is positioned on the floor 56 so that when the wheel 54 encounters the obstacle (e.g., the door threshold 60), the bearing 40 is vertically aligned with the reaction plate. When the wheel 54 is about to contact the door threshold 60, the bearing 40 is rotated (optionally by a motor, not shown). As the large diameter portion of the bearing 40 rotates towards downward, the bearing protrudes past the bottom of the cargo dolly 50, and comes into contact with the reaction plate 58. On further rotation toward maximum downward extension, the pressure of the bearing 40 on the reaction plate 58 causes the cargo dolly to rise off the floor 56, thus lifting the wheel 54 so that it can easily overcome the obstacle, as seen in FIG. 5. Since the outer race member 14 of the bearing 40 can rotate relative to the inner race member 44, the bearing 40 permits the cargo dolly 50 to advance by rolling on the surface of the reaction plate 58. Once the wheel 54 has cleared the obstacle, the bearing 40 is rotated to return to the retracted position.

In alternative embodiments, a cargo dolly may have two or more wheels with a cam mounted on the dolly near each wheel. It will also be appreciated that is it not necessary that the bearing 40 protrude past the bottom of the chassis at maximum downward extension. On the other hand, if the bearing 40 is configured to extend beyond the bottom of the wheel 54 at maximum downward extension of the bearing, the bearing can bear directly against the floor 56 to lift the wheel, and it will not be necessary to employ the reaction plate 58.

The terms "first," "second," and the like, herein do not denote any order, quantity, or importance, but rather are used to distinguish one element from another. In addition, the terms "a" and "an" herein do not denote a limitation of quantity, but rather denote the presence of at least one of the referenced item.

Although the invention has been described with reference to particular embodiments thereof, it will be understood by one of ordinary skill in the art, upon a reading and understanding of the foregoing disclosure, that numerous variations and alterations to the disclosed embodiments will fall within the spirit and scope of this invention and of the appended claims.

What is claimed is:

1. A cargo dolly comprising a chassis, a wheel on the chassis, a drive shaft on the chassis near the wheel and a circular cam mounted eccentrically on the drive shaft, wherein the cam comprises:
  a inner race member having an end surface; and
  an outer race member disposed about the inner race member, the outer race member having an internal shoulder for engaging the end surface of the inner race member;
  the inner race member and the outer race member being configured to define a raceway between them and to define a snap ring seat between them;

a plurality of cylindrical rollers disposed in the raceway between the inner race member and the outer race member; and a snap ring in the snap ring seat.

2. A method of assembling a cam of a cargo dolly comprising a chassis, a wheel on the chassis, a drive shaft on the chassis near the wheel and a circular cam mounted eccentrically on the drive shaft, wherein the method of assembling the cam comprises:

providing a inner race member having an outside diameter and an end surface and a first snap ring groove;

providing an outer race member having a first shoulder having an internal diameter that is larger than the outside diameter of the inner race member and having a second snap ring groove, the outer race member further having a second shoulder having an internal diameter that is less than the outside diameter of the inner race member, the second shoulder further having a stop surface, the outer race member having an interior surface between the first shoulder and the second shoulder for receiving cylindrical rollers therein, disposing a plurality of cylindrical rollers in the interior surface;

inserting the inner race member into the outer race member so that the stop surface engages the end surface and so that the first snap ring groove and the second snap ring groove are aligned to define a seat for a snap ring;

disposing a snap ring in the seat.

* * * * *